(12) United States Patent
Chen

(10) Patent No.: US 6,904,604 B2
(45) Date of Patent: Jun. 7, 2005

(54) DISC DRIVE WITH SHOCKPROOF MECHANISM HAVING TRAY WITH BLOCK PREVENTING ESCAPE OF CAM SHAFT FROM TRACK

(75) Inventor: Wen-Tsan Chen, Yunlin (TW)

(73) Assignee: BenQ Corporation, Taoyuan (TW)

( * ) Notice: Subject to any disclaimer, the term of this patent is extended or adjusted under 35 U.S.C. 154(b) by 153 days.

(21) Appl. No.: 10/617,562

(22) Filed: Jul. 11, 2003

(65) Prior Publication Data

US 2004/0013072 A1 Jan. 22, 2004

(30) Foreign Application Priority Data

Jul. 17, 2002 (TW) ........................................ 91210895 U

(51) Int. Cl.[7] .......................... G11B 17/03; G11B 17/04; G11B 33/02
(52) U.S. Cl. ....................................................... 720/613
(58) Field of Search ................................. 720/613, 610, 720/606, 607, 602, 600; 369/30.96, 30.99, 77.11

(56) References Cited

U.S. PATENT DOCUMENTS

| 3,802,710 | A | * | 4/1974 | Mazza ........................... 369/217 |
| 6,854,124 | B2 | * | 2/2005 | Shimizu et al. ............... 720/606 |
| 2002/0036969 | A1 | * | 3/2002 | Kitamura ..................... 369/75.2 |

FOREIGN PATENT DOCUMENTS

TW      338555      8/1998

\* cited by examiner

*Primary Examiner*—Julie Anne Watko
(74) *Attorney, Agent, or Firm*—Snell & Wilmer L.L.P.

(57) ABSTRACT

The present invention discloses a shockproof mechanism for a disc drive. The disc drive includes a tray and a chassis. The tray has a track thereon, and the track includes a first end and a second end. A shaft is disposed on the chassis and engages with the track. When the tray is driven into the disc drive, the shaft moves from the first end to the second end. A block is disposed near the second end of the track for preventing the shaft escaping from the track through the second end.

16 Claims, 9 Drawing Sheets

DISC DRIVE WITH SHOCKPROOF MECHANISM HAVING TRAY WITH BLOCK PREVENTING ESCAPE OF CAM SHAFT FROM TRACK

CROSS REFERENCE TO RELATED APPLICATIONS

This Application claims priority to Taiwan Patent Application No. 091210895 filed on Jul. 17, 2002.

FIELD OF INVENTION

The present invention relates to a disc drive, and more particularly, to a shockproof structure of a disc drive.

BACKGROUND OF THE INVENTION

A disc drive has become one of the essential data-accessing devices in a personal computer nowadays. As a disc drive is hit by a foreign object, the deformation of the structure of the disc drive might result in damage to the inner elements of the disc drive. An example would be the collision between the damper and the turntable of the disc drive, causing the damper to be deformed. Since any damage to the inner elements of the disc drive is likely to cause malfunction, the disc drive needs to avoid collision.

FIG. 1 illustrates the chassis structure of a conventional disc drive which includes a main chassis 102 and a sub chassis 104. The main chassis 102 is the primary frame of the disc drive, and generally, the sub chassis 104 is connected to a turntable and an optical pickup head (not shown in FIG. 1). The main chassis 102 and the sub chassis 104 are attached together with a cam rack 106. The cam rack 106 has a shaft 108, and a slot 1062 engaged with a stick (not shown in FIG. 1) disposed on the sub chassis 104 so that the sub chassis 104 is able to change its position when the cam rack 106 is moved.

When the cam rack 106 is in a first position as shown in FIG. 1, the sub chassis 104 stays in a low position. When the cam rack 106 is in a second position as shown in FIG. 2, the sub chassis 104 shifts to a high position correspondingly. FIG. 3 illustrates the backside view of the tray of a conventional disc drive. Referring to FIG. 3, the backside of the tray 202 includes a track 204 which has a first end 206 and a second end 208. As the tray 202 enters the disc drive in the direction of the arrow shown in FIG. 1, the shaft 108 engages with the track 204 and then moves from the first end 206 toward the second end 208 along the track 204. The cam rack 106 is gradually shifting toward the left of FIG. 1 when the shaft 108 approaches the second end 208. Eventually, the cam rack 106 is located at the second position as the tray 202 has completely entered the disc drive.

FIG. 4 is the explosive view of the inner components of a conventional disc drive. The cam rack, the tray, and the optical pickup head are not illustrated in FIG. 4 so as to clearly indicate the structures of the main chassis 102 and the sub chassis 104. The turntable 112 is disposed on a motor 114, which is disposed on the sub chassis 104. The sub chassis 104 has a stick 1042 configured to engage with the slot 1062 of the cam rack 106 shown in FIG. 1. The damper 110 is disposed on an assembly base 116, which is disposed within the housing of the disc drive (not shown). As mentioned above, when the tray 202 enters the disc drive, the sub chassis 104 will move from the low position to the high position and thus lead the turntable 112 and the optical pickup head (not shown) to ascend. Thereafter, the turntable 112 and the damper 110 together are able to clip a disc disposed on the tray 202 tightly by magnetic attraction between the turntable 112 and the damper 110.

Generally speaking, the shaft 108 will not move farther when reaching the second end 208 of the track 204 as shown in FIG. 5. However, the shaft 108 might depart from the track 204 in the direction of the arrow shown in FIG. 5 when the disk drive is hit by a foreign object or during a proceeding of a bumping test. If the shock on the disc drive is too huge, even the track 204 cannot retain the shaft 108, and the shaft 108 departs from the track 204 over the wall thereof. Once the shaft 108 departs from the track 204, the tray 202 cannot freely move in and out of the disc drive.

Moreover, when the cam rack 106 is in the second position and the sub chassis 104 is in the high position, the turntable 112 and the damper 110 will be very close to each other. Once a collision resulting from a shock occurs, it is very likely that either the turntable 112 or the damper 110 gets so deformed that either cannot operate normally.

SUMMARY OF THE INVENTION

One aspect of the present invention is to provide a shockproof mechanism for a disc drive, which avoids the deformation of the turntable and the clamper of the disc drive and allows the shaft of the disc drive to remain in a track if a shock occurs.

The shockproof disc drive of the present invention includes a tray and a chassis. The tray includes a track defining a first end and a second end. The chassis includes a shaft engaging with the track. When the tray enters the disc drive, the shaft shifts from the first end toward the second end of the track. In the first embodiment of the present invention, there is a block configured at one side of the second end of the track in order to prevent the shaft from detaching off the track.

To improve the shockproof mechanism of a disc drive, the shapes of the block and the shaft can be of various configurations. For example, the block can be a trapezoid block and the shaft can have a recess corresponding to the trapezoid block. When the shaft moves from the first end toward the second end, the trapezoid block mates with the recess so that the shaft will not jump out of the track. The trapezoid block includes a first surface near the bottom surface of the tray, and a second surface opposed to the first surface. In one embodiment of the present invention, the first surface of the trapezoid block is substantially parallel to the tray bottom surface, and the second surface of the trapezoid block is an inclined plane with respect to the tray bottom surface. In another embodiment of the present invention, both the first surface and the second surface are inclined planes respectively defining two angles with respect to the tray bottom surface. Such specific shape designs of the block and the shaft can effectively prevent the shaft from detaching off the track when a shock against the disc drive occurs. In addition, the aforementioned inclined planes can generate lateral force for reacting on the sub chassis to make it descend and, therefore, diminish the probability of collision between the turntable and the clamper.

The shapes of the block and shaft may be exchanged. For example, the shaft may include a protrusion and the block may include a recess correspondingly. When the shaft reaches the second end, the protrusion mates with the recess so that the shaft will not drop out of the track as well. Of course, the recess may be a trapezoid recess and the corresponding protrusion may be a trapezoid protrusion. Similarly, the trapezoid protrusion of the shaft has a first surface and a second surface. The first surface is adjacent to the bottom surface of the tray, and the second surface is opposed to the first surface. In another embodiment of the present invention, the first surface is substantially parallel to the tray bottom surface and the second surface is an inclined plane with respect to the tray bottom surface. Furthermore, both the first surface and the second surface can be inclined planes respectively defining two angles with respect to the tray bottom surface. The trapezoid recess and trapezoid protrusion of the above-mentioned embodiments mate with each other to prevent the shaft from detaching off the track.

DETAILED DESCRIPTION

The present invention provides a disc drive with a specific structure for preventing a shaft from detaching off a track or in other words, for causing the shaft of a cam rack to stay within the track when the disc drive is shocked.

Figure 6:
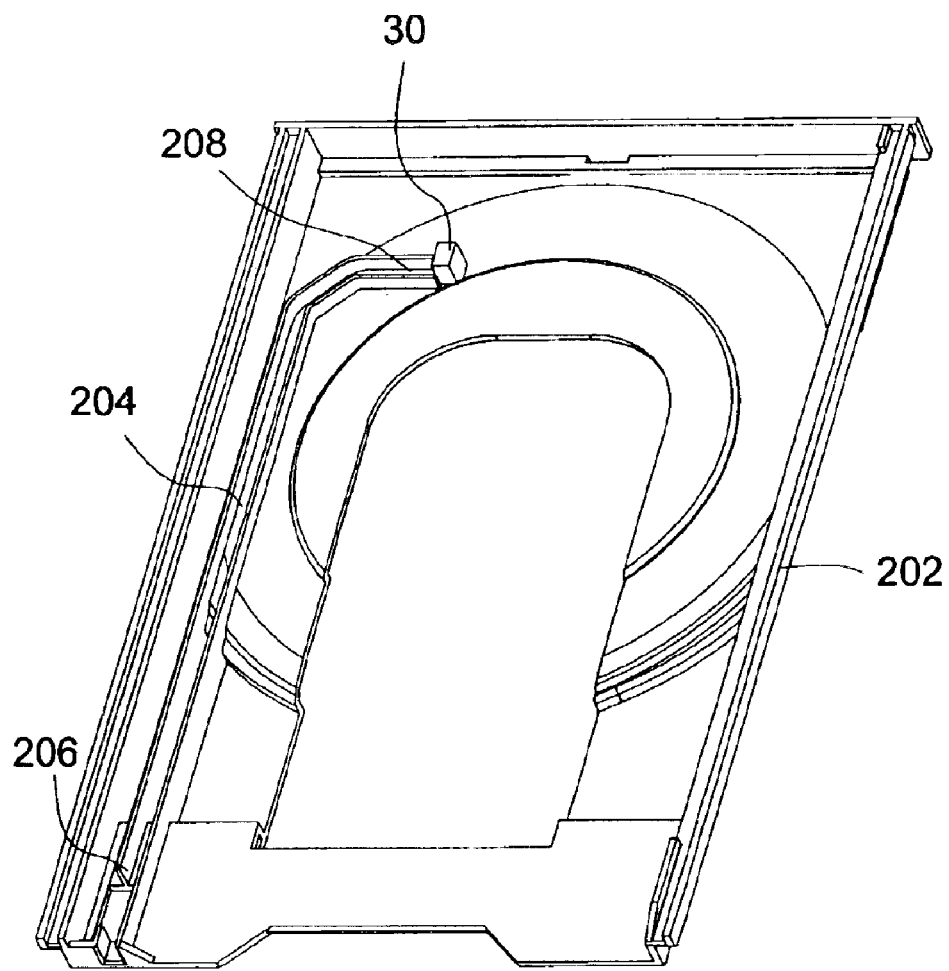
FIG. 6 illustrates the backside of the tray of the present invention.
Figure 7:
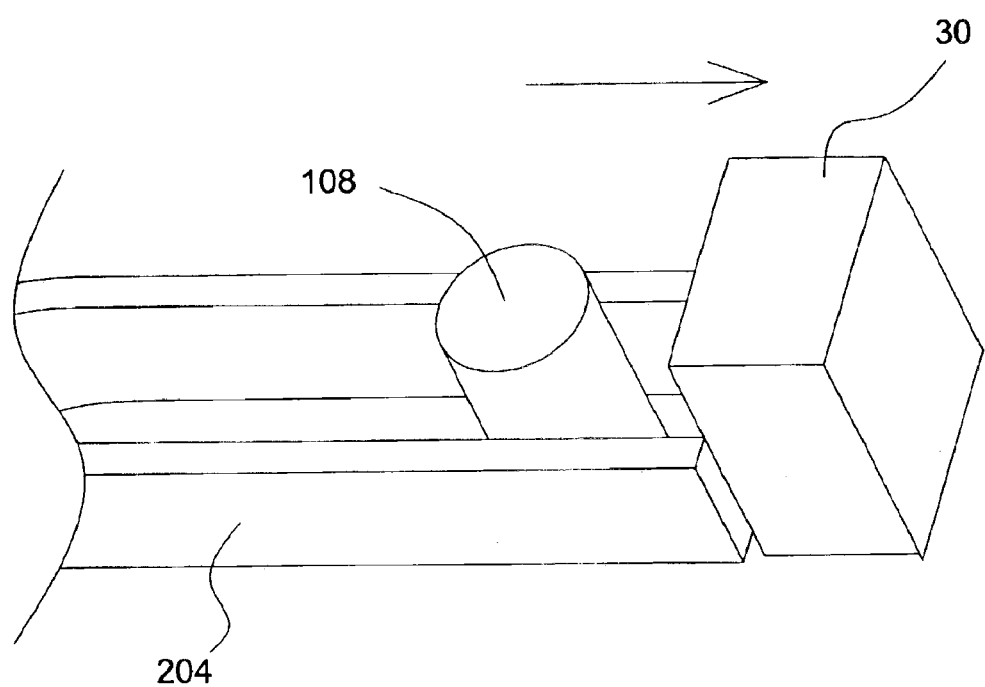
FIG. 7 illustrates the track with a block at one end in an embodiment of the present invention.

FIG. 6 illustrates the back view of the tray of the present invention. Referring to FIG. 6, the block 30 is disposed on the tray 202 near the second end 208 of the track 204. FIG. 7 illustrates the relative position of the block 30 and the track 204. As shown in FIG. 7, once the disc drive is shocked and the shaft 108 is forced to sprint suddenly in the direction of the arrow, the block 30 can stop the momentum of the shaft 108 in order to keep the shaft 108 within the track 204.

Figure 1:
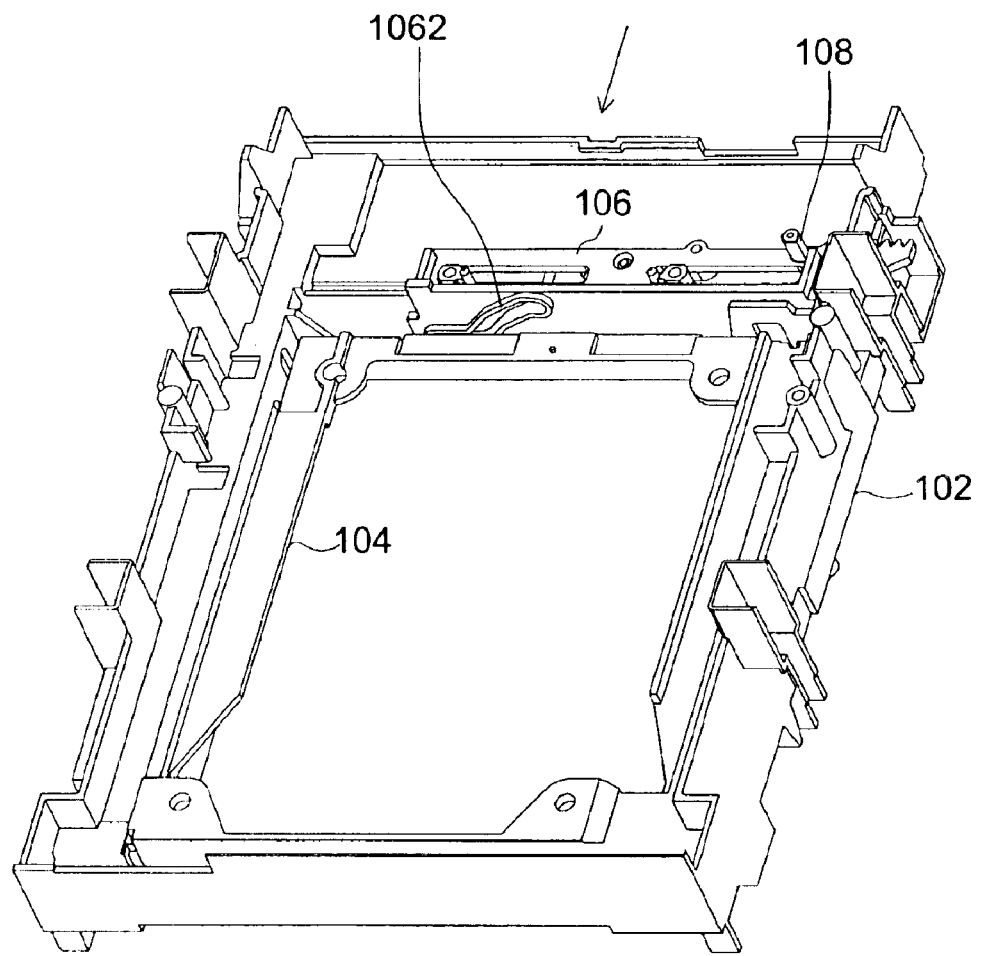
FIG. 1 and FIG. 2 illustrate the chassis structures of disc drives of the prior art.
Figure 2:
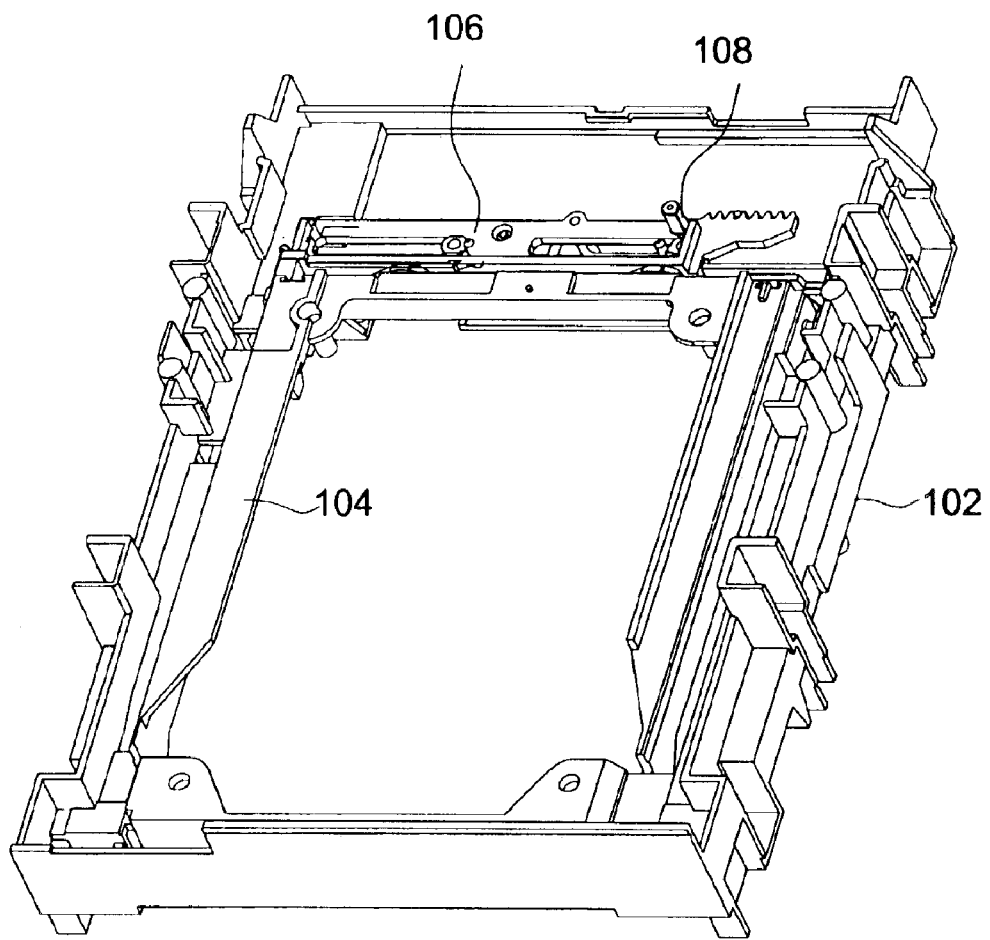
Figure 3:
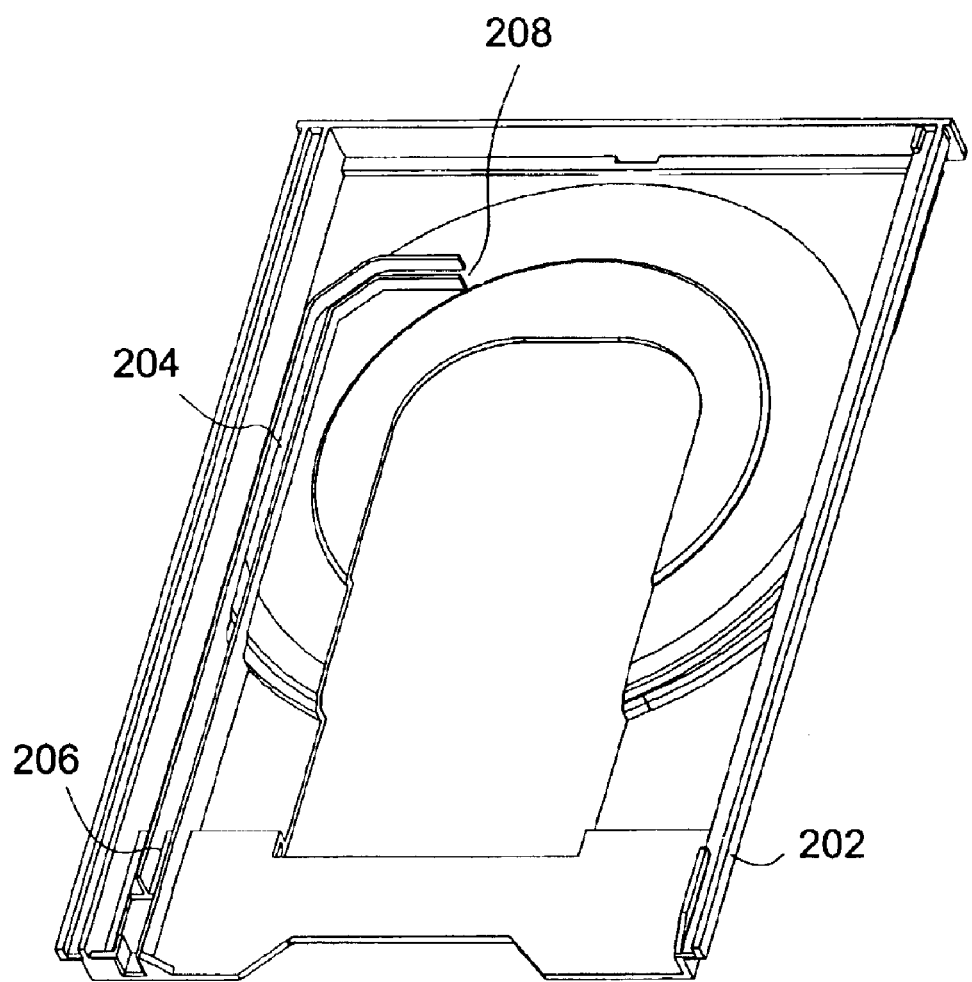
FIG. 3 illustrates the back view of a tray of the prior art.
Figure 4:
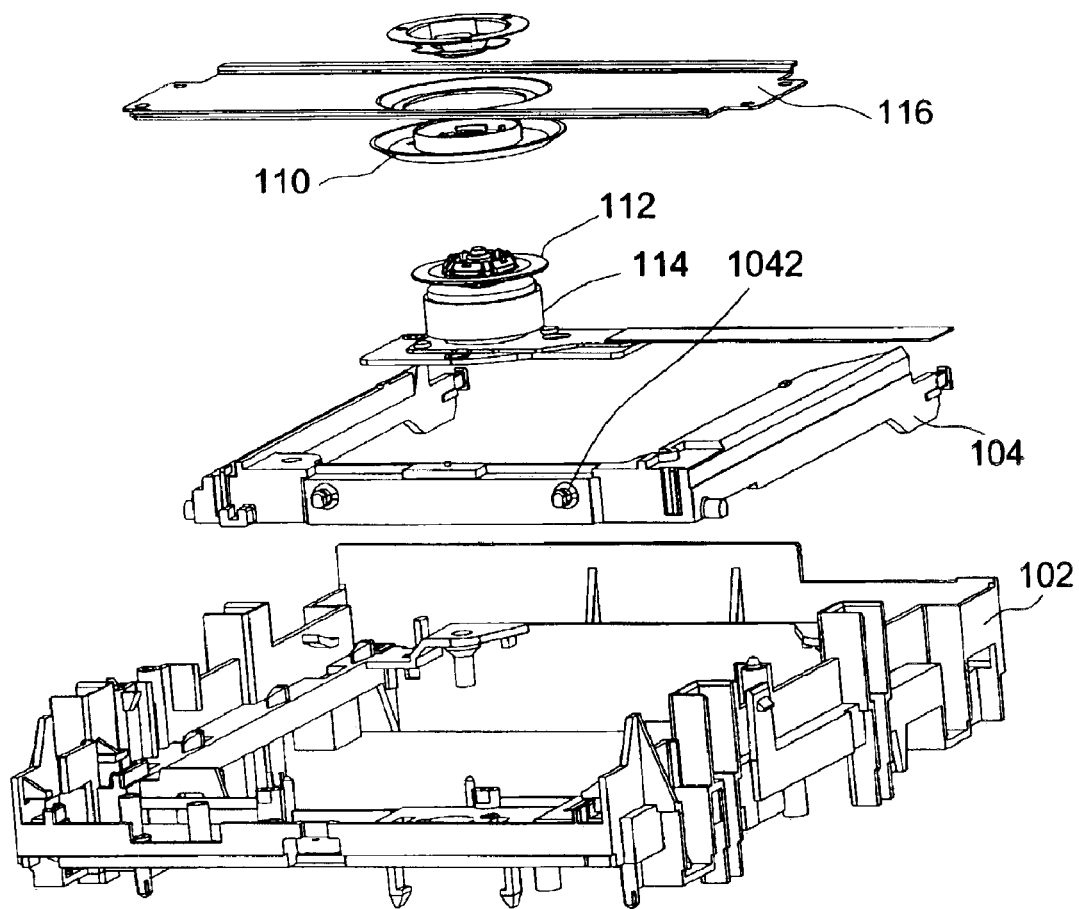
FIG. 4 is the explosive view of the inner elements of a disc drive of the prior art.
Figure 5:
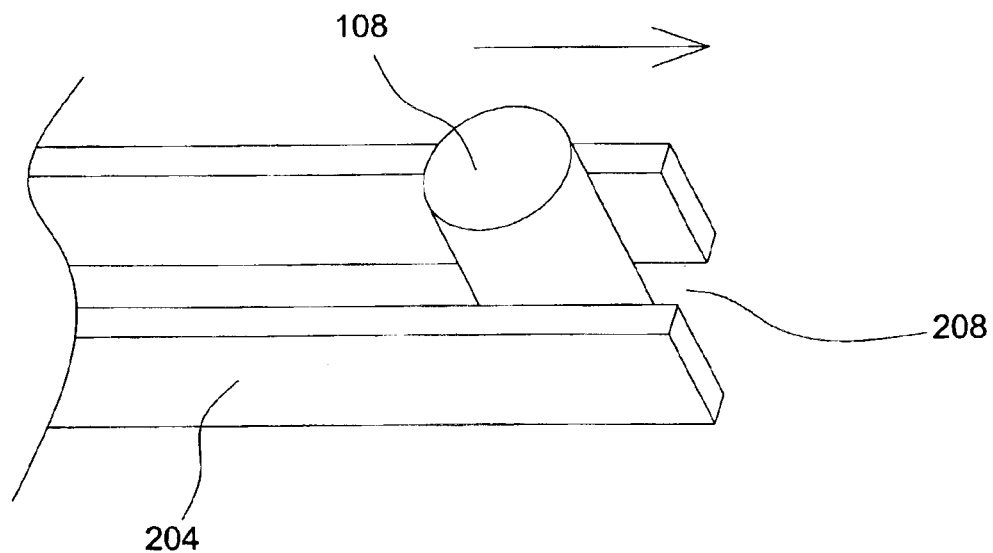
FIG. 5 illustrates the shaft and the track of the prior art.

More explicitly, when the shaft 108 moves quickly in the direction of the arrow and finally bumps against the block 30, a lateral force, provided by the block 30 and reacting on the shaft 108, will make the shaft 108 move in the opposite direction. Simultaneously with the opposite movement of the shaft 108, the cam rack 106 also shifts from the second position in FIG. 2 toward the first position in FIG. 1, which causes the sub chassis 104 to shift from the high position in FIG. 2 toward the low position in FIG. 1. Accordingly, the turntable 112 disposed on the sub chassis 104 is able to leave the damper 110 farther and reduce the probability of collision between the turntable 112 and the damper 110; the deformation of either one is thereby avoided.

Figure 8A:
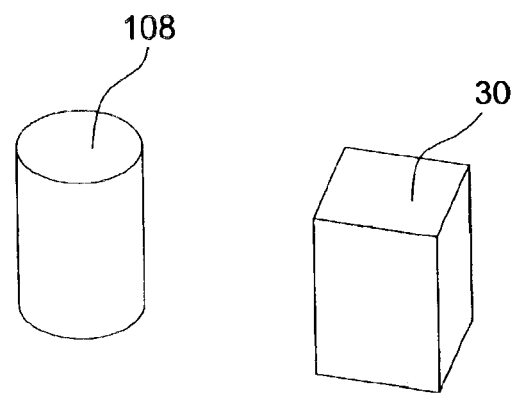
FIG. 8A to FIG. 8E illustrate exemplary shapes of the shafts and the blocks of the present invention.

As FIG. 8A shows, the block 30 of the first embodiment is cube. This cubic shape is capable of restraining the shaft 108 from escaping in the direction of the arrow shown in FIG. 7 but not in other directions. The present invention further provides some available shapes for the shaft 108 and the block 30 to mate with each other and further to prevent the shaft 108 from detaching off the track 204 in any directions as a shock occurs.

Figure 8B:
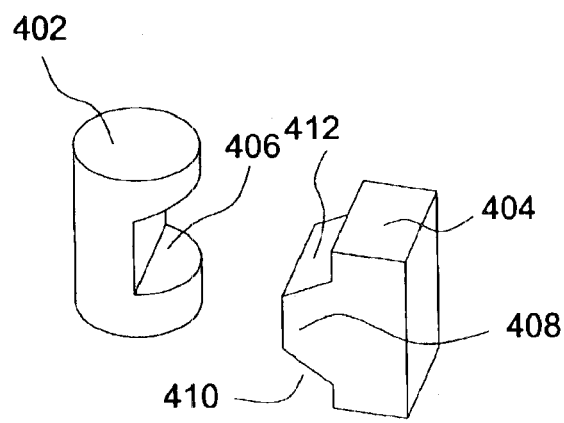

Referring to FIG. 8B, the block 404 of the second embodiment has a protrusion 408, of which a trapezoid shape is preferred, and the shaft 402 of the second embodiment has a recess 406 corresponding to the protrusion 408. The protrusion 408 includes two surfaces 410 and 412. When the shaft 402 hits the block 404, the recess 406 mates with the protrusion 408 so the shaft 402 is kept within the track 204.

Figure 8C:
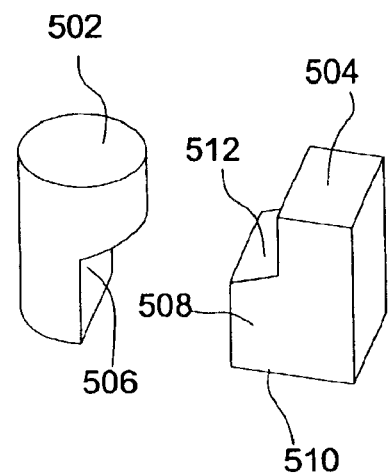

Referring to FIG. 8C, the block 504 of the third embodiment has a protrusion 508, of which a trapezoid shape is preferred, and the shaft 502 of the third embodiment includes a recess 506 corresponding to the protrusion 508. The protrusion 508 includes a first surface 510 and a second surface 512. The first surface 510 is adjacent to and substantially parallel to the bottom surface of the tray 202, and the second surface 512 is opposed to the first surface 510 and defines an angle with respect to the bottom surface of the tray 202. When the shaft 502 hits the block 504, the recess 506 mates with the protrusion 508 so the shaft 502 is kept within the track 204.

Figure 8D:
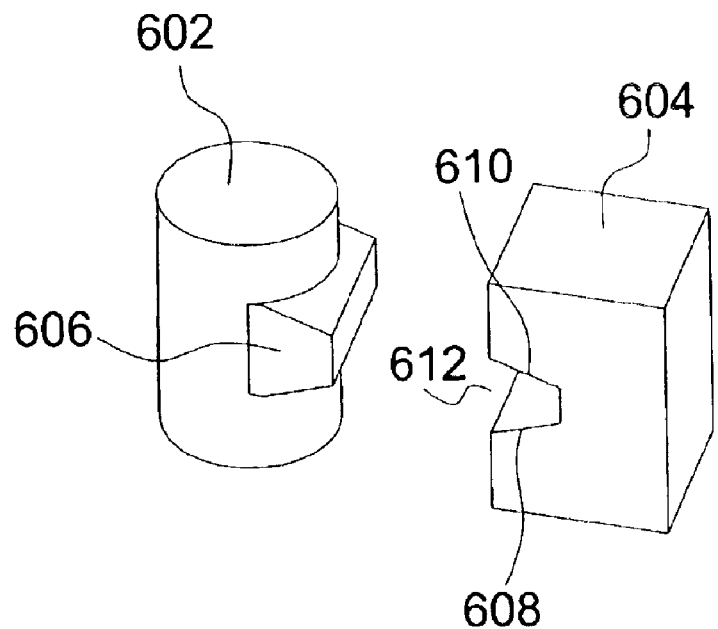

Referring to FIG. 8D, the shaft 602 of the fourth embodiment has a protrusion 606, of which a trapezoid shape is preferred, and the block 604 of the fourth embodiment has a recess 612 corresponding to the protrusion 606. The recess 612 includes a first surface 608 and a second surface 610. The first surface 608 is adjacent to the bottom surface of the tray 202, and the second surface 610 is opposed to the first surface 608. The first surface 608 and the second surface 610 respectively define a first and second angle with respect to the bottom surface of the tray 202. When the shaft 602 hits the block 604, the recess 612 mates with the protrusion 606 so the shaft 602 is kept within the track 204.

Figure 8E:
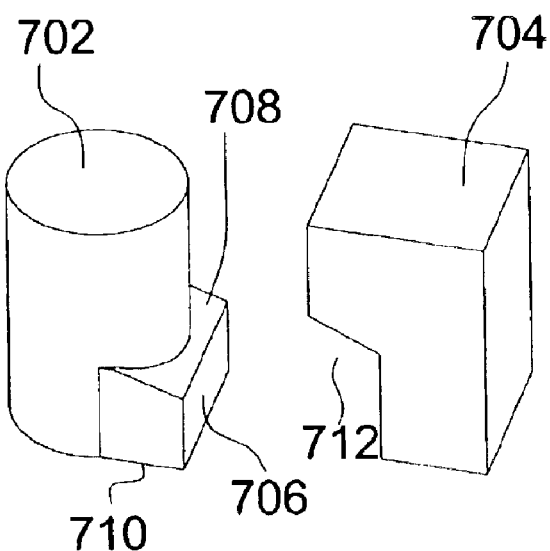

Referring to FIG. 8E, the block 704 of the fifth embodiment has a recess 712, of which a trapezoid shape is preferred, and the shaft 702 of the fifth embodiment has a protrusion 706 corresponding to the recess 712. The protrusion 706 includes a first surface 710 and a second surface 708. The first surface 710 is adjacent to and substantially parallel to the bottom surface of the tray 202. The second surface 708 is opposed to the first surface 710 and defines an angle with respect to the bottom surface of the tray 202. When the shaft 702 hits the block 704, the recess 712 mates with the protrusion 706 so the shaft 702 is kept within the track 204.

The aforementioned embodiments respectively include recesses and blocks mating with each other to prevent the shaft from jumping out of the track in any direction when a shock occurs. The shapes of the recesses and blocks are preferred to be trapezoid because the inclined planes of trapezoids do not cause a stuck predicament if both of them collide with each other hard. Moreover, the lateral force provided by the block makes the sub chassis descend in order to reduce the contact probability of the turntable and the clamper.

The above description of the preferred embodiments is expected to clearly expound the characteristics of the present invention but not expected to restrict the scope of the present invention. Those skilled in the art will readily observe that numerous modifications and alterations of the apparatus may be made while retaining the teaching of the invention. Accordingly, the above disclosure should be construed as limited only by the bounds of the claims set forth hereinafter.

I claim:

1. A disc drive, comprising:
   a tray having a track, said track including a first end and a second end;
   a chassis having a shaft, said shaft engaging with said track, and as said tray moves into said disc drive, said shaft moving from said first end toward said second end; and a block, disposed at one side of said second end, for preventing said shaft escaping from said track through said second end.

2. The disc drive of claim 1, wherein said block is a trapezoid block, said shaft further comprises a first recess corresponding to said trapezoid block, and as said shaft moves from said first end toward said second end, said trapezoid block mates with said first recess for preventing said shaft from detaching off said track.

3. The disc drive of claim 2, said tray including a bottom surface, said trapezoid block including a first surface and a second surface, said first surface being adjacent to and substantially parallel to said tray bottom surface, said second surface being opposed to said first surface and defining an angle with respect to said bottom surface.

4. The disc drive of claim 2, said tray including a bottom surface, said trapezoid block including a first surface and a second surface, said first surface being adjacent to said tray bottom surface, said second surface being opposed to said first surface, said first surface and said second surface respectively defining a first and second angle with respect to said bottom surface.

5. The disc drive of claim 1, wherein said block further includes a recess, and said shaft includes a protrusion corresponding to said recess, and said shaft moves from said first end toward said second end, said recess mates with said protrusion for preventing said shaft from detaching off said track.

6. The disc drive of claim 5, wherein said recess is a trapezoid recess and said protrusion is a trapezoid protrusion.

7. The disc drive of claim 6, said tray including a bottom surface, said protrusion of said shaft including a first surface and a second surface, said first surface being adjacent to and substantially parallel to said tray bottom surface, said second surface being opposed to said first surface and defining an angle with respect to said bottom surface.

8. The disc drive of claim 6, said tray including a bottom surface, said protrusion of said shaft including a first surface and a second surface, said first surface being adjacent to said tray bottom surface, said second surface being opposed to said first surface, said first surface and said second surface respectively defining a first and second angle with respect to said bottom surface.

9. A disc drive having a housing, comprising:
   a first chassis disposed in said housing;
   a cam rack slidably disposed on said first chassis, said cam rack having a slot,
   a second chassis having a pin engaging with said slot, and, as said cam rack is in a first position, said second chassis being in a low position, and as said cam rack is in a second position, said second chassis being in a high position;
   a turntable, disposed on said second chassis, for selectively supporting a disc;
   a tray movably disposed on said first chassis, said tray including a track, said track defining a first end and a second end;
   a damper disposed in said housing, as said second chassis is in said low position, said damper moving away from said turntable, and as said second chassis is in said high position, said damper touching with said turntable;
   a shaft, disposed on said cam rack, engaging with said track, as said tray moves into said disc drive, said shaft moving from said first end toward said second end; and
   a block, disposed at said second end of said track, for selectively blocking said shaft and for preventing said shaft escaping from said track through said second end;
   wherein, as said shaft hits against said block, said block provides a lateral force allowing said cam rack to move from said second position toward said first position forcing said second chassis to move from said high position to said low position and to move said turntable away from said damper thereby preventing said turntable and said damper from deformation.

10. The disc drive of claim 9, wherein said block is a trapezoid block, said shaft further comprises a recess corresponding to said trapezoid block, and as said shaft moves from said first end toward said second end, said trapezoid block mates with said recess for preventing said shaft from detaching off said track.

11. The disc drive of claim 10, said tray including a bottom surface, said trapezoid block including a first surface and a second surface, said first surface being adjacent to and substantially parallel to said tray bottom surface, said second surface being opposed to said first surface and defining an angle with respect to said bottom surface.

12. The disc drive of claim 10, said tray including a bottom surface, said trapezoid block including a first surface and a second surface, said first surface being adjacent to said tray bottom surface, said second surface being opposed to said first surface, said first surface and said second surface respectively defining a first and second angle with respect to said bottom surface.

13. The disc drive of claim 9, wherein said block further includes a recess, and said shaft includes a protrusion corresponding to said recess, and said shaft moves from said first end toward said second end, said recess mates with said protrusion for preventing said shaft from detaching off said track.

14. The disc drive of claim 13, wherein said recess is a trapezoid recess and said protrusion is a trapezoid protrusion.

15. The disc drive of claim 14, said tray including a bottom surface, said protrusion of said shaft including a first surface and a second surface, said first surface being adjacent to and substantially parallel to said tray bottom surface, said second surface being opposed to said first surface and defining an angle with respect to said bottom surface.

16. The disc drive of claim 14, said tray including a bottom surface, said protrusion of said shaft including a first surface and a second surface, said first surface being adjacent to said tray bottom surface, said second surface being opposed to said first surface, said first surface and said second surface respectively defining a first and second angle with respect to said bottom surface.

* * * * *